July 6, 1926.    1,591,426
E. T. LAKE
FRUIT WASHING MACHINE
Filed April 2, 1924    11 Sheets-Sheet 1

Fig.1.

INVENTOR.
E. T. Lake
BY John D. Morgan
ATTORNEY.

E. T. LAKE

FRUIT WASHING MACHINE

Filed April 2, 1924

INVENTOR.
E. T. Lake
BY John D. Morgan
ATTORNEY.

July 6, 1926.

E. T. LAKE 1,591,426

FRUIT WASHING MACHINE

Filed April 2, 1924     11 Sheets-Sheet 6

INVENTOR.
E. T. Lake
BY John D Morgan
ATTORNEY.

July 6, 1926.

E. T. LAKE 1,591,426

FRUIT WASHING MACHINE

Filed April 2, 1924    11 Sheets-Sheet 8

Fig.10.

INVENTOR
E. T. Lake
BY John D. Morgan
ATTORNEY

Patented July 6, 1926.

1,591,426

UNITED STATES PATENT OFFICE.

EUGENE T. LAKE, OF DEMAREST, NEW JERSEY, ASSIGNOR TO FALCON PACKING COMPANY, INC., A CORPORATION OF NEW YORK.

FRUIT-WASHING MACHINE.

Application filed April 2, 1924. Serial No. 703,656.

The invention relates to a novel machine for treating fruit and other esculents, and especially olives, during the packing thereof, and more especially for rinsing or washing the fruit and then filling the bottles with brine or other liquid.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 9 is a detached side elevation of the receiving and holding means for the trays of fruit-containing bottles or receptacles, taken on line 9—9 of Fig. 12;

The invention is directed to the rapid, facile, expeditious, economical and sanitary treating of fruit by fluids, and in the preferred form such treatment consists in repeated washings of receptacled fruit, such as olives, and preferably also a final application of preserving liquid to the receptacled fruit.

The mechanism presented herewith as the present preferred embodiment of the invention comprises means for receiving and holding the bottles or other fruit-containing receptacles; these receptacles being preferably in trays, and applying repeated washings of water, or other fluid to the receptacled fruit, the receiving and holding means being tipped after each washing to discharge the washing water. Of course, a single washing could be used instead, but usually repeated washings are necessary or desirable.

The mechanism is constructed and arranged so that the washing operation may be regulably timed and the discharge of the washing fluid will follow sequentially and automatically.

The fruit is retained in the receptacles by mechanical means without coming into contact with the hands of an attendant. Mechanism is provided compelling the attendant to wash each bottle of fruit a required number of times, and is so arranged that the attendant cannot withdraw the receptacles of fruit until the predetermined number of successive washings have been effected.

It will be understood that the foregoing general description and the following detail description are explanatory and exemplary of the invention, but are not restrictive thereof.

Referring now in detail to the embodiment of the invention shown by way of example in the accompanying drawings, means are provided for receiving and holding a plurality of trays, each tray carrying a plurality of bottles, or like receptacles, containing the fruit to be washed, or otherwise treated. In the embodied form thereof (Figs. 1, 2, 9, 10, 12 and 13), a bottom or support 1 is provided having thereon a plurality of suitable guideways 2, in this instance accommodating two trays, each tray having four rows of bottles thereon.

In this present embodiment, the washing means cooperate directly with the bottle holding means, and these will be described together. In the bottle holding means above referred to, there is above each tray on top a top member 5 (Figs. 1, 9, 10, 12 and 13) which is movable to and fro vertically whereby it may be moved down upon the open tops of the fruit-containing bottles, or other receptacles, and clamp them firmly in position during the washing, and may be moved upwardly so that the trays of bottles containing the washed fruit may be readily removed and new trays of bottles be inserted for the next washing.

As embodied, these tops 5 comprise or constitute open pans with vertical side edges 7 adapted to hold liquid. The bottoms 6 of these pans 5 are provided with apertures 8, which aline with the open tops of the bottles in the trays, and through these openings 8 and grooves in the bosses 9 the liquids pass into and out of the bottle. About each of the openings 8, and extending downwardly from the bottom side of the member 5 are a series of bosses 9 adapted to fit over, press upon, and hold the respective bottles firmly in place in their trays and upon the base 1. Preferably, spiral springs 10, or other suitable means, are provided, which extend into the necks of the bottles and hold the fruit in place, so that it will not be disturbed by the tipping of the bottles.

In the embodied form of means for moving the tops 5 up and down for the purposes described (see Figs. 1, 3, 4, 9, 10, 12 and 13), each top 5 has at each side thereof lugs 20, respectively, internally apertured to slide upon corresponding vertically-disposed rods 21, which rods are fixed to, and extend upwardly from, the base 1. Each of the tops 5, at either side thereof, has also a pivotal connection 24 by an elongated opening with an arm 25 extending backwardly to the rear of the machine. These arms 25, in pairs, corresponding to the two tops 5, are rotatably carried on a rod or shaft 26, which is mounted in brackets 27, 28 and 29, these brackets being fixed upon and extending upwardly from the base 1.

The tops 5 are moved a short distance up and down by the slight swinging of the arms 25, and the embodied form of means for effecting this motion (Figs. 1, 4, 9, 12 and 13) comprises an apertured plate 30, fixed to the forward end of the outside arm of each pair of arms 25. A member 31 fits loosely and movably within the aperture in the plate 30 and is screw-threaded on a rod 32, being held in place by nuts 39 and 40'. Rod 32 is fixed to the strap of an eccentric 33, which eccentric is fixed on a shaft 34. The shaft 34 is journaled in brackets 35 and 36, carried on the base 1. It will be understood that there is a similar mechanism at either side of the bottle holder.

Figure 12:
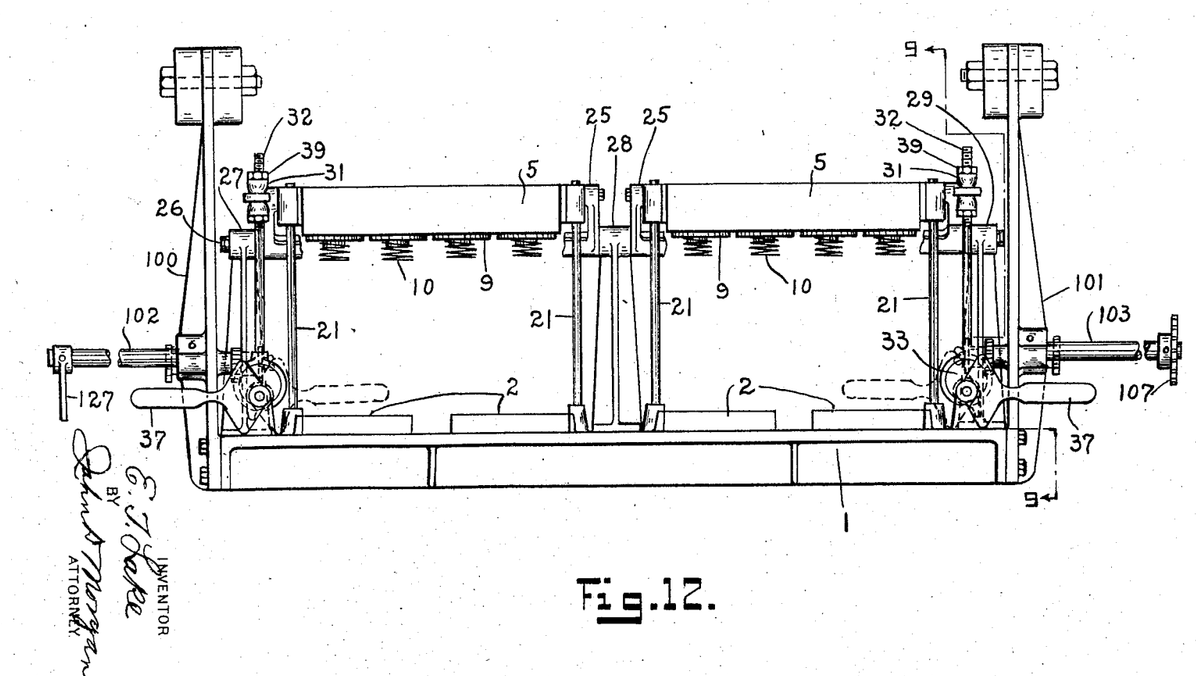
Fig. 12 is a detached view looking at Fig. 9 from the left.
Figure 13:
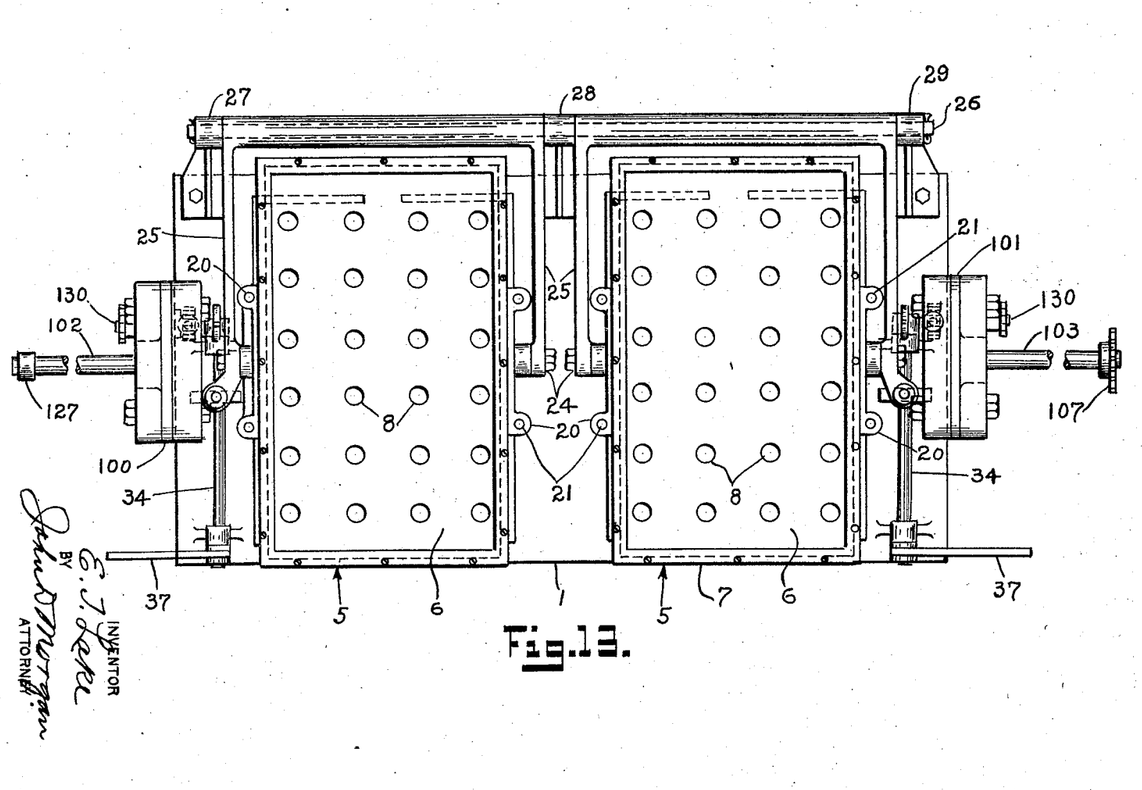
Fig. 13 is a top plan corresponding to Fig. 12.

An actuating device fixed to the shaft 34, at either side, as stated, comprises a handle 37, which may be thrown from the full line to the dotted line position in Fig. 12. In the full line position it raises the top 5 for the insertion and withdrawal of trays of bottles, and in the dotted line position of that figure it clamps the top down upon the bottles.

Means are provided when the bottles and their trays are so clamped in the receiving and holding means, by the tops 5 being clamped down thereon, for filling the bottles with washing water and thereafter emptying the water therefrom. In connection with the embodied form thereof, these means are constructed to give dwells in the movement, thereby giving time to permit an inflow of washing water into the fruit receptacle, and then to effect the emptying.

In the embodied form of water supplying means (Figs. 1, 2, 3, 7 and 13) a plurality of pipes 40 are arranged above the pans or tops 5, the pipes being apertured to let the water pour down into the pans, and therefrom through the apertures 8 into the bottles of fruit in the holder. The pipes 40 communicate through a system of piping 41 with a valve 42, (Fig. 2) and preferably a tank or air chamber 43 is provided to compensate for variations in the pressure of the water supply.

Figure 1:
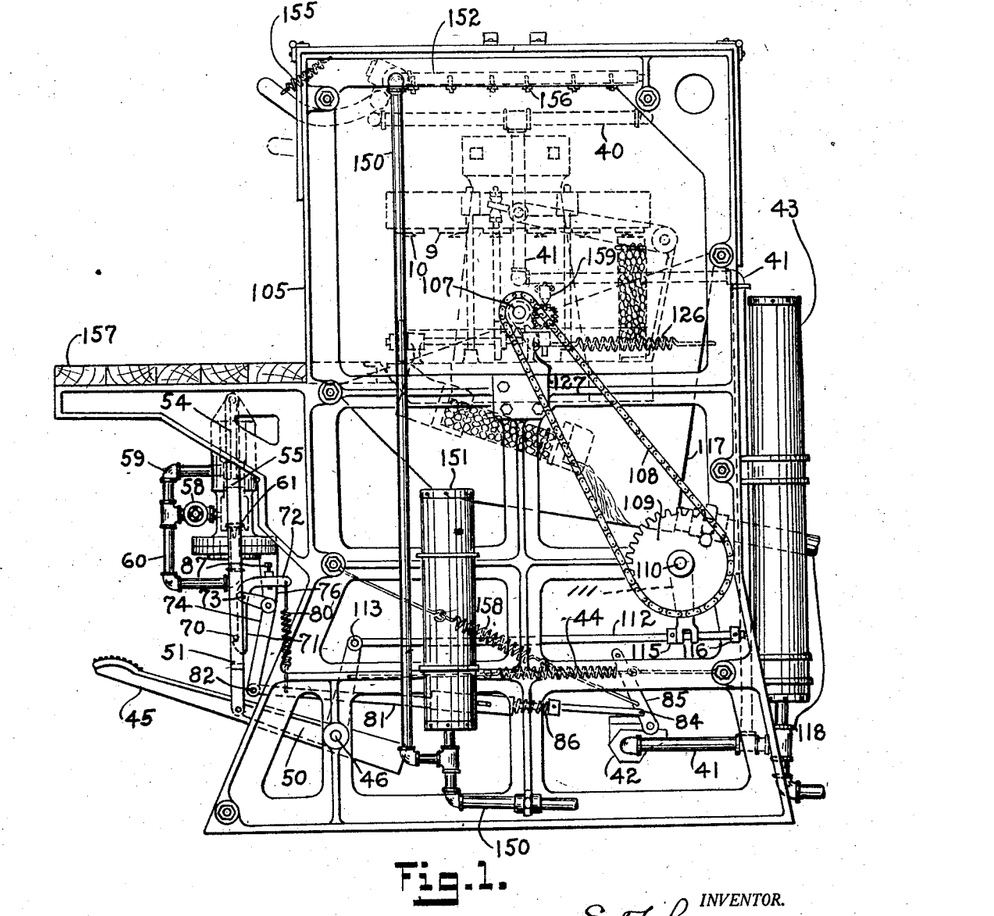
Fig. 1 is a side elevation of a machine embodying my invention.
Figure 2:
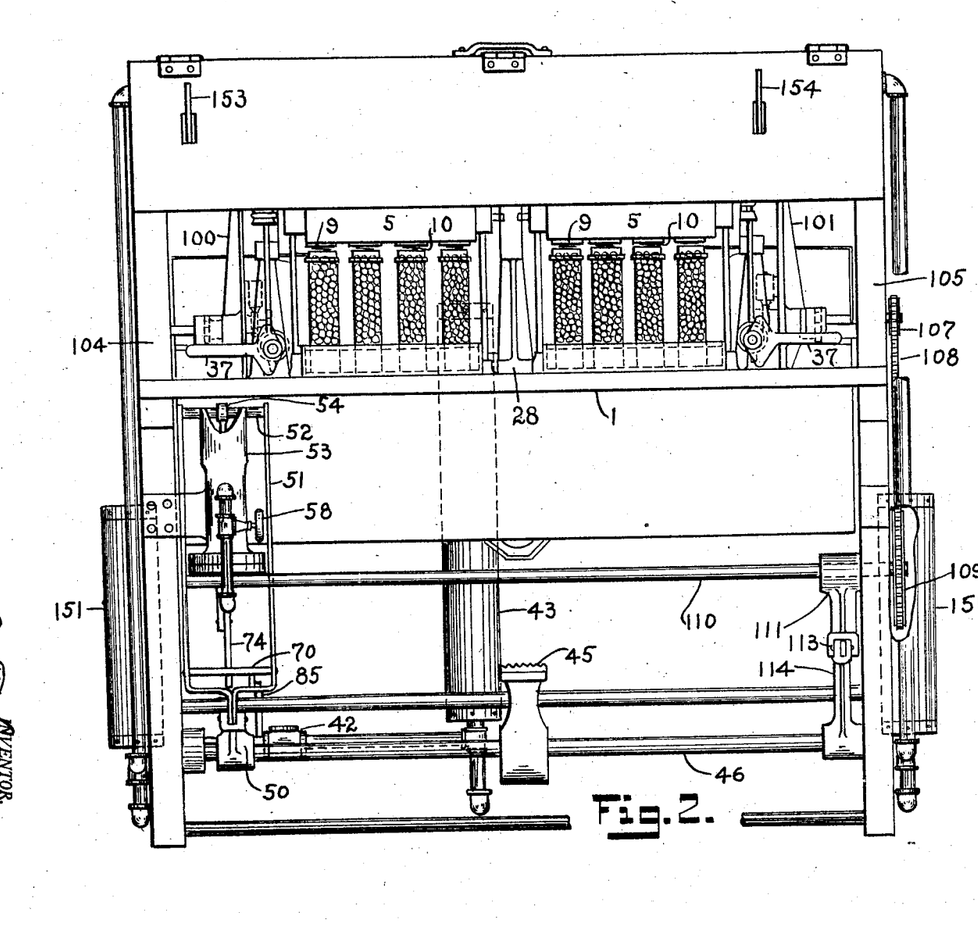
Fig. 2 is a front elevation looking at Fig. 1 from the left.
Figure 3:
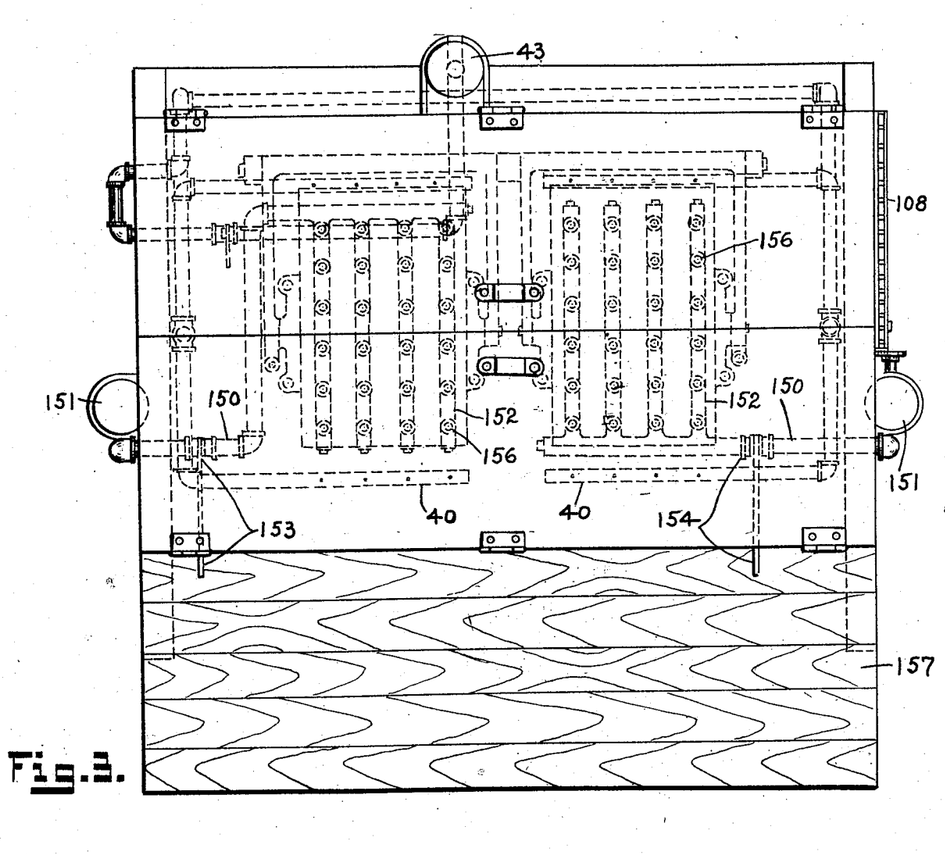
Fig. 3 is a top plan corresponding to Figs. 1 and 2.
Figure 4:
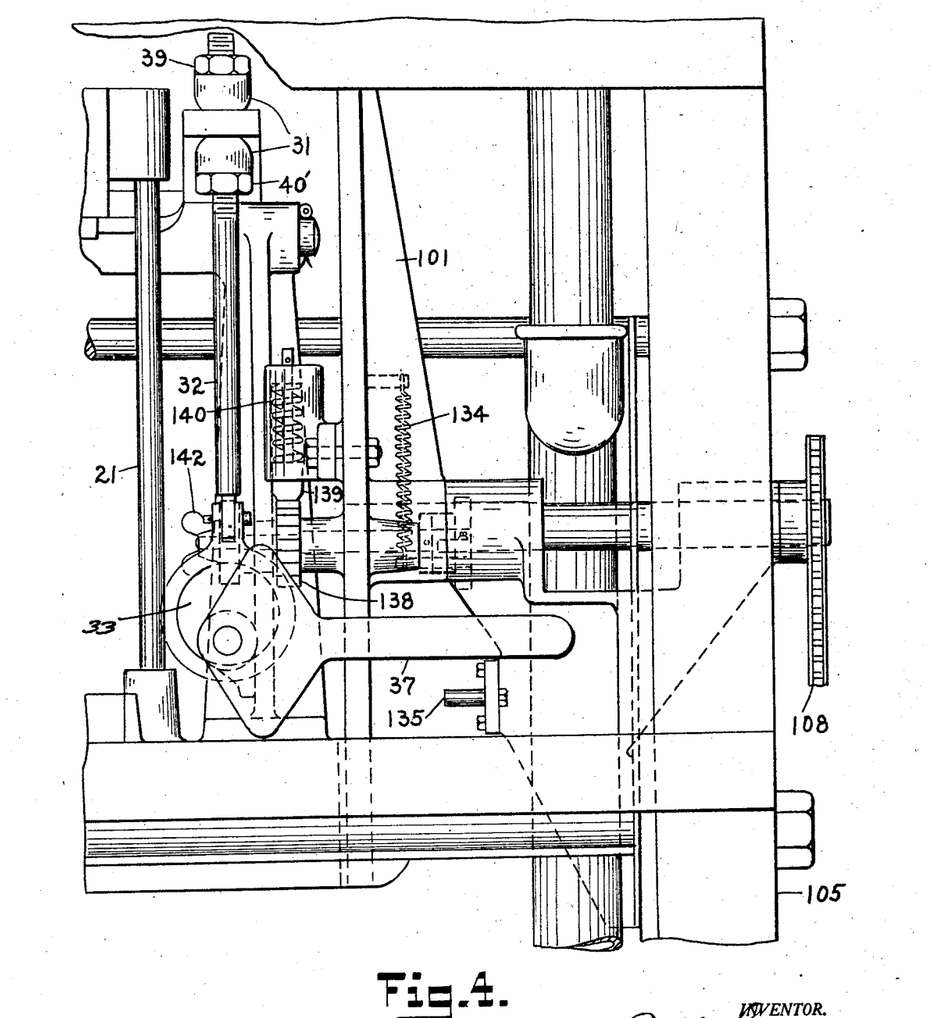
Fig. 4 is a fragmentary elevation, greatly enlarged, of the mechanism for locking the fruit receptacles in the washing mechanism and associated devices.
Figure 5:
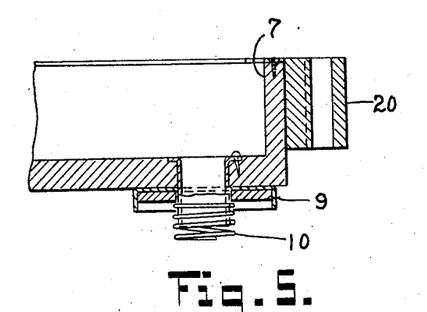
Fig. 5 is a fragmentary detail, greatly enlarged, of the devices for holding the fruit in the bottles and for admitting the washing liquid.
Figure 6:
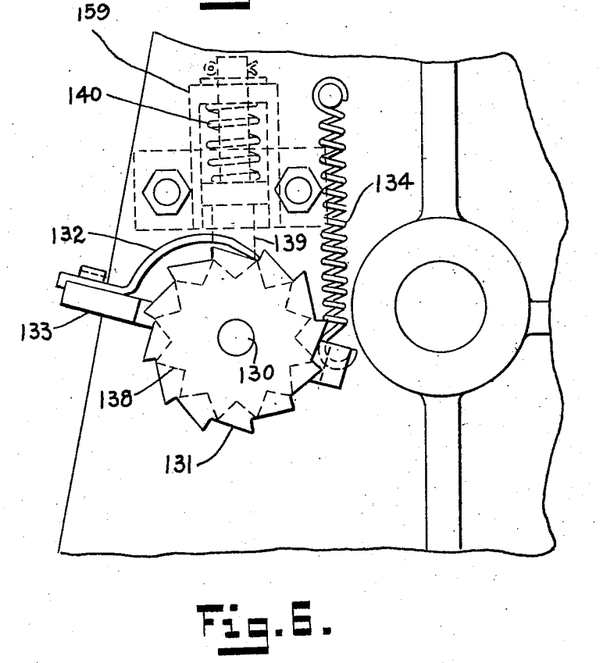
Fig. 6 is an enlarged fragmentary view of a part of the mechanism for insuring a predetermined number of washings.
Figure 7:
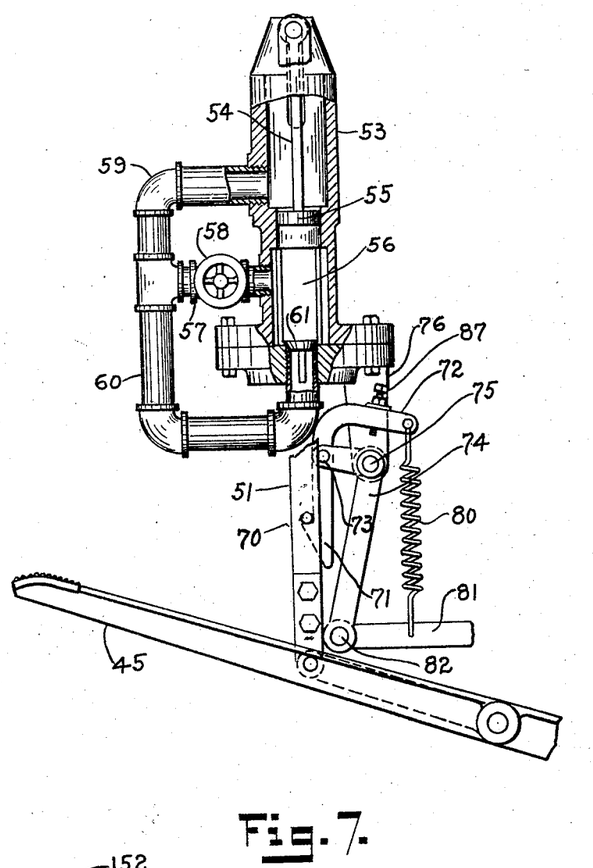
Fig. 7 is an enlarged detail, partly in vertical section, of the control for the washing water.
Figure 8:
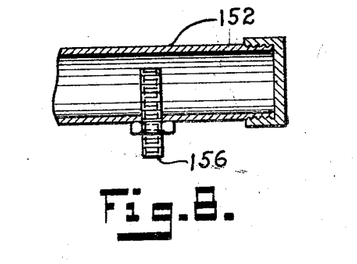
Fig. 8 is a fragmentary vertical section through one of the brine supplying pipes.
Figure 10:
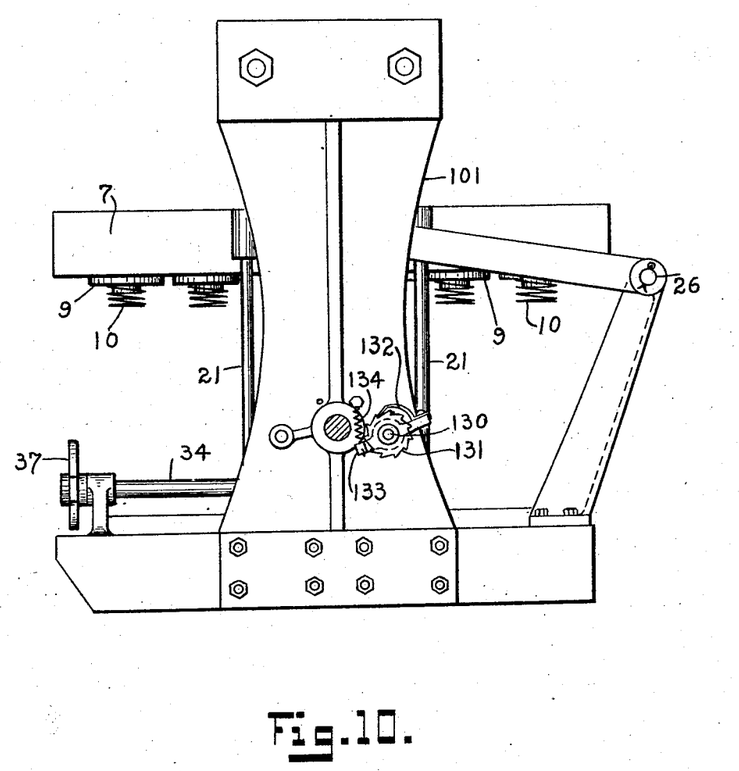
Fig. 10 is an elevation looking at Fig. 12 from the right.

In the embodied form of water control (Figs. 1, 2 and 7), a pedal 45 is fixed on a shaft 46, journaled in the machine frame. Fixed to the shaft 46 is a lever arm 50, to which is pivoted a looped link 51. Pedal lever 45 has a restoring spring 44 (Fig. 1). At the top thereof, link 51 has a cross rod 52, which works in slots in a cylindrical tank 53 supported on the machine frame. Pivotally connected on rod 52 (Fig. 7) is a piston rod 54 to which is attached a piston 55 working in a cylinder 56, opening downwardly from the bottom of the open chamber 53. Opening from the side of the chamber 56 is a pipe 57, controlled by a valve 58. The pipe 57 opens into a pipe 59 which communicates with the open tank 53. Pipe 57 opens also into a pipe 60, which communicates with the bottom of the cylinder 56, under the control of a check valve 61.

The connections from the foregoing mechanism to the valve 42 (Figs. 1, 2 and 7) comprise a pin 70, fixed in one of the arms of the loop link 51, a detent hook 71 on a bent lever 72 cooperating with the pin 70. Lever 72 is pivoted at 73 upon one arm of the lever 74. Lever 74 in turn is pivoted on a bracket 76, supported from the cylinder already described. The bent end of lever 72 is connected by a tension spring 80 with a connecting link 81, pivotally connected at 82 to the lever 74. Link 81 is pivotally connected at its other end 84 with a lever 85, which actuates the valve 42. A resilient connection 86 of any suitable form may be provided in the link 81 if desired. An adjusting screw 87 may also be provided for regulating the action of the actuating mechanism from the valve.

In the operation of the foregoing mechanism (Figs. 1, 2 and 7), when the attendant steps on the foot lever 45, the piston 55 is moved downwardly, and while it passes through the upper part of cylinder 56, wherein it fits tightly, its movement will be slow, and its speed will be determined by the setting of the valve 58, as the fluid must pass through this valve and rise into the open tank 53. This movement of the piston corresponds to the washing action of the machine. As soon, however, as the piston has passed into the lower large portion of the cylinder 56 its motion will be very rapid, as the fluid can circulate in the cylinder around the piston. This motion of the piston corresponds to the tipping of the bottle holder to empty the washwater from the bottles.

Referring now to the slow, early part of the movement, as piston 55 descends, the link 51 moves downwardly therewith, and due to the engagement of hook 71 with pin 70, lever 74 is rocked toward the right (Figs. 1 and 7) and valve 42 is opened. Thereby, the water is caused to flow from the pipes 40 into the tops or pans 5, and passing through openings 8, fills the interstices in the bottles of fruit. During this movement the hook 71 rocks clear of pin 70, and the lever 85 is snapped shut through the action of spring 158. The remainder of the quick motion of the mechanism just described has to do with the emptying of the wash-water out of the bottles of fruit, and the mechanism therefor will now be described.

The bottle holder (Figs. 1, 2, 9, 10, 12 and 13) has upwardly-extending side plates or frame members 100 and 101, which side plates have projecting horizontally outwardly therefrom, respectively, pintles or shafts 102 and 103, which are journaled, respectively, in the upright side frames 104 and 105. Fixed to the outer end of shaft 103 is a sprocket wheel 107, over which runs a sprocket chain 108. This chain runs also over a sprocket wheel 109, fixed on a shaft 110, which shaft is journaled in the machine frame.

Fixed on shaft 110 (Fig. 1) is an arm 111, which supports in an aperture at its outer end a swivel bearing in which rod 112 is loosely mounted, the rod being longitudinally reciprocable in its bearing in the arm. The other end of rod 112 is pivoted at 113 to an arm 114, fixed on shaft 46. Fixed on rod 112 are two collars 115 and 116, located and spaced apart at either side of arm 111, to give considerable play for free longitudinal movement of the rod 112 before it begins actuating arm 111 in either direction.

Thus when the lever 45 (Fig. 1) is depressed during the early part of its movement for the washing operation, as already described, rod 112 moves idly in its mounting in the arm 111. When the bottles have thus been filled with the washing liquid, and piston 55 permits the relatively rapid later movement of pedal 45, collar 116 engages and rocks arm 111, rotating sprocket wheels 109 and 107. The entire bottle holder is rocked about its shaft 102 and 103 from the horizontal position shown in Fig. 1 to the position slightly past the vertical shown in that figure.

In this position, the washing fluid runs out of the bottles through the apertures 8 and is emptied from the top 5, into the receiving pan 117 and flows away through the discharge pipe 118. As the mechanism is restored through the action of the restoring spring 44 for the foot lever, rod 112 moves in the opposite direction (i. e. to the right in Fig. 1), collar 115 engages arm 111, and moves sprocket wheels 109 and 108 in the opposite direction, and the holder swings upwardly again to horizontal position, and presents the bottles again in position for a succeeding washing. An additional restoring spring 126, in tension between the frame and an arm 127, fixed on shaft 102 may be used; and also a similar spring on the other side, if desired.

Means are provided by the invention whereby the operator of the machine is compelled in every case to give a prescribed or predetermined number of washings. In the embodied form of such means (Figs. 4, 6, 9, 10, 11, 12 and 13) a short shaft 130 is mounted preferably at either side of the machine, in the upright members 100 and 101 of the holder or receiver for the bottle trays. Fixed on shaft 130 of each of these mechanisms is a ratchet wheel 131, and a pawl 132 cooperates therewith, this pawl being fixed on an arm 133, loosely mounted on the hub of ratchet wheel 131. A coil spring 134 acts to restore the pawl 132 after it has been actuated.

To actuate pawl 132, there is fixed on the machine frame a pin 135, upon which the arm 132 (Fig. 4) strikes during the tipping of the bottle holder to empty the wash water, and thus the pawl 132 imparts a definite partial rotation to shaft 130. Fixed also on shaft 130 is a notched wheel 138, (Figs. 4, 5, 9 and 11), with which cooperates a spring-pressed detent 139, which is acted on by a coil spring 140, mounted within a housing 159. The detent 139 and notched wheel 138, insure that the exact desired partial rotation shall be imparted to shaft 130 during each tipping operation of the bottle holder.

Fixed also to rotate with shaft 130 is a disk 141 having a plurality of slots 143 formed therein. These disks are, however, removable and interchangeable, so that the number of predetermined washings may be changed by using disks 141 with different numbers of slots therein. The shown means for fixing the disk 141 relatively to shaft 130 comprises a wing nut 142 (Fig. 11) secured onto a screw-thread projecting from a squared portion of shaft 130, the squared portion fitting in a square hole in disc 141. Fixed on shaft 34 is a finger 144 which is in line with the slots 143 in disk 141, and must pass through one of the slots whenever levers 37 and therewith their shafts 34 are rocked to raise and lower the tops 5 and thus unclamp and clamp the bottles.

Figure 11:
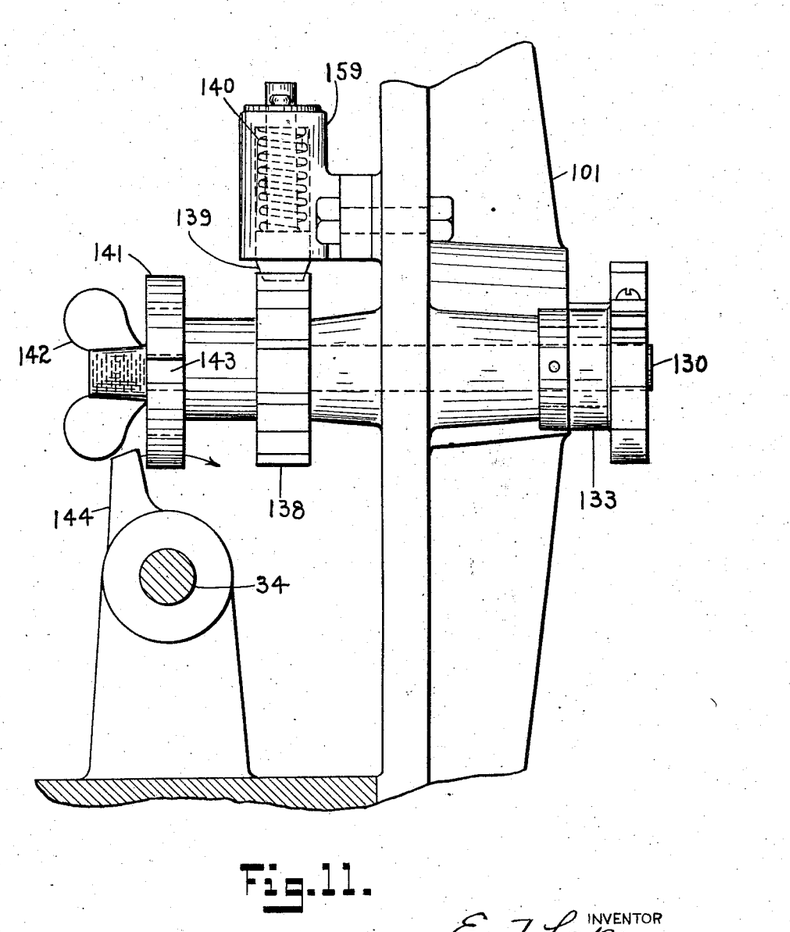
Fig. 11 is a fragmentary detail looking at Fig. 6 from the left.

In the operation of the mechanism, after the bottles are filled with wash water and the holder is then tipped to empty the wash water, pawl 133, of each of these mechanisms at either side of the machine, strikes its pin 135, and gives a partial rotation to shaft 130. Thereby the slot 143 in disk 141 is rotated out of alinement with the finger 144 (Figs. 9 and 11). Due to this, lever arm 37 cannot be rocked from the dotted line or clamping position of Fig. 12 to the full line or releasing position of that figure. Nor can this releasing action be effected until the next slot 143 in disk 141 is in alinement with the finger 144. The parts have been proportioned so that the alinement of this second slot 143 with the finger 144 will occur only after the bottle holder has been tipped the predetermined number of times, and the bottle holder can be tipped each time only after the bottles have been filled with the washing water.

Means are provided for surrounding the fruit in the bottles with a preserving liquid, such as brine, at the close of the washing operation. As embodied (Figs. 1, 2, 3, 8 and 13), brine supplying pipes 150 are provided, and may be equipped if desired with an equalizing tank 151. These pipes extend upwardly to a system of distributing pipes 152 arranged above the tops or pans 5. They may be provided also with controlling valves 153 and 154 which may be manually operable and spring-closed by springs 155. At the close of the washing operation the attendant will actuate these valves manually and fill the bottles with the brine or other preserving fluid. Adjustable discharge nipples 156 may be provided, which may be screwed into and out of the pipe 152 to regulate the flow of the preserving fluid.

The manner of operation of the foregoing mechaninsm will be understood from the statements of operation appended to the description of each group of mechanism. It may be stated by way of résumé:

The trays of bottles of fruit may be placed upon the table 157 and pushed upon the base 1 of the bottle holder, the tops 5 being in elevated position. Levers 37 are then rocked from the full line to the dotted line position in Fig. 12, and the bosses 9 are thus brought down firmly on the tops of the bottles, thereby holding them by compression in place in the trays and in the holder. The springs 10 hold the fruit down in the bottles. During this action, the finger 144 passes through a slot 143 in the disk 141. The apertures 8 are now over the tops of the various bottles.

The operator then steps upon lever 45, and the water valve 42 is opened through the actuation of lever 85, and the water flowing from the pipes 40 into the tops or pans 5, fills the bottles around the fruit receptacled therein. Due to the hook 71 slipping from pin 70, the wash water is cut off at the proper point, and the remainder of the movement of the foot lever 45 tips the bottle holders and the water is emptied out from the bottles as shown in Fig. 1. During the return movement of the lever 45, the bottle holder is swung back to horizontal position as already described.

While the invention is at present devised especially for washing fruit, and for convenience is so claimed, it will be understood that it is adapted for use in washing and otherwise treating other kinds of esculents.

The invention in its broader aspects is not limited to the specific mechanisms shown and described, nor solely to the treatment of fruit as above stated, but departures may be made therefrom within the scope of the accompanying claims without departing from the principles of the invention and without sacrificing its chief advantages.

What I claim is:—

1. A fruit treating machine including in combination means for presenting receptacled fruit, means automatically retaining the fruit in the receptacle, means for washing the fruit, and means for supplying a preserving fluid to the washed receptacled fruit.

2. A fruit treating machine including in combination means for presenting receptacled fruit, means automatically retaining the fruit in the receptacle, and means for compelling a predetermined number of washings of the fruit.

3. A fruit treating machine including in combination means for presenting receptacled fruit, means automatically retaining the fruit in the receptacle, means for washing the fruit, and means for overturning the receptacle to empty the washing water.

4. A fruit treating machine including in combination means for presenting in upright position a receptacle containing fruit, means for supplying a washing liquid to wash the fruit in the upright receptacle, means for inverting the receptacle to empty the washing fluid, and means for retaining the fruit in the receptacle.

5. A fruit treating machine including in combination means for presenting in upright position a receptacle containing fruit, means for supplying a washing liquid to wash the fruit in the upright receptacle, means for inverting the receptacle to empty the washing fluid, means for retaining the fruit in the receptacle, and means for compelling repeated washings of the fruit and emptyings of the washing liquid.

6. A fruit treating machine including in combination means for receiving and holding a removable and replaceable tray carrying a plurality of fruit-containing receptacles, means for simultaneously washing the fruit in all the receptacles, means for emptying the washing fluid, and means for retaining the fruit in position.

7. A fruit treating machine including in combination means for receiving and holding a removable and replaceable tray carrying a plurality of fruit-containing receptacles, means for simultaneously washing the fruit in all the receptacles, means for emptying the washing fluid, means for retaining the fruit in position, and means for compelling a plurality of washings of the receptacled fruit, before the tray and fruit receptacles can be removed.

8. A fruit treating machine including in combination means for receiving and holding a removable and replaceable tray carrying a plurality of fruit containing receptacles in substantially upright position, means for simultaneously washing the fruit in all the receptacles, means for inverting the tray to empty the washing fluid, and means for retaining the fruit in position.

9. A fruit treating machine including in combination means for receiving and holding a removable and replaceable tray carrying a plurality of fruit containing receptacles, means for simultaneously washing the fruit in all the receptacles, means for inverting and emptying the washing fluid, means for retaining the fruit in position, and means for compelling a plurality of washings of the receptacled fruit and successive emptying of the washing liquid, before the tray and fruit receptacles can be removed.

10. A fruit treating machine including in combination means for receiving and holding a removable and replaceable tray carrying a plurality of fruit containing receptacles in substantially upright position, means for simultaneously washing the fruit in all the receptacles, means for inverting the tray to empty the washing fluid, means for retaining the fruit in position, and means for compelling a plurality of washings of the receptacled fruit and successive emptyings of the washing liquid before the tray and fruit receptacles can be removed.

11. In a fruit washing machine, the combination of means for presenting a bottle in upright position for washing, means for washing the interior of a bottle in substantially upright position and means for simultaneously lowering and inverting the bottle to empty the washing liquid.

12. In a fruit washing machine, the combination of means for presenting a bottle in upright position for washing, means for washing the interior of a bottle in substantially upright position, means for simultaneously lowering and inverting the bottle to empty the washing liquid, and means for compelling a plurality of washings and emptyings of the washing liquid before the bottle can be removed from said presenting means.

13. In a fruit washing machine, the combination of means for receiving and holding a tray containing a plurality of bottles, means for washing the bottles on the tray, means for compelling a plurality of washings of the bottles before they can be removed from said receiving and holding means and means for supplying clean washing fluid for the successive washings.

14. In a fruit washing machine, the combination of means for presenting a bottle in upright position for washing, means for washing the interior of a bottle in substantially upright position, means for inverting the bottle to empty the washing liquid, means for supplying preserving fluid and means for filling the washed bottles with the preserving fluid.

15. In a fruit washing machine, the combination of means for presenting a bottle in upright position for washing, means for washing the interior of a bottle in substantially upright position, means for inverting the bottle to empty the washing liquid, means for compelling a plurality of washings and emptyings of the washing liquid before the bottle can be removed from said presenting means, means for supplying preserving fluid and means for filling the washed bottles with the preserving fluid.

16. A fruit treating machine including in combination means for presenting in upright position a receptacle containing fruit, means for supplying a washing liquid to wash the fruit in the upright receptacle, means for inverting the receptacle to empty the washing fluid, means for retaining the fruit in the receptacle, means for supplying preserving fluid and means for filling the washed bottles with the preserving fluid.

17. A fruit treating machine including in combination means for presenting in upright position a receptacle containing fruit, means for supplying a washing liquid to wash the fruit in the upright receptacle, means for inverting the receptacle to empty the washing fluid, means for retaining the fruit in the receptacle, means for compelling repeated washings of the fruit and emptyings of the washing liquid, means for supplying preserving fluid and means for filling the washed bottles with the preserving fluid.

In testimony whereof, I have signed my name to this specification.

EUGENE T. LAKE.